Aug. 20, 1968      R. B. KENNEDY      3,397,840
TIME SCHEDULE CALCULATOR
Filed June 5, 1967
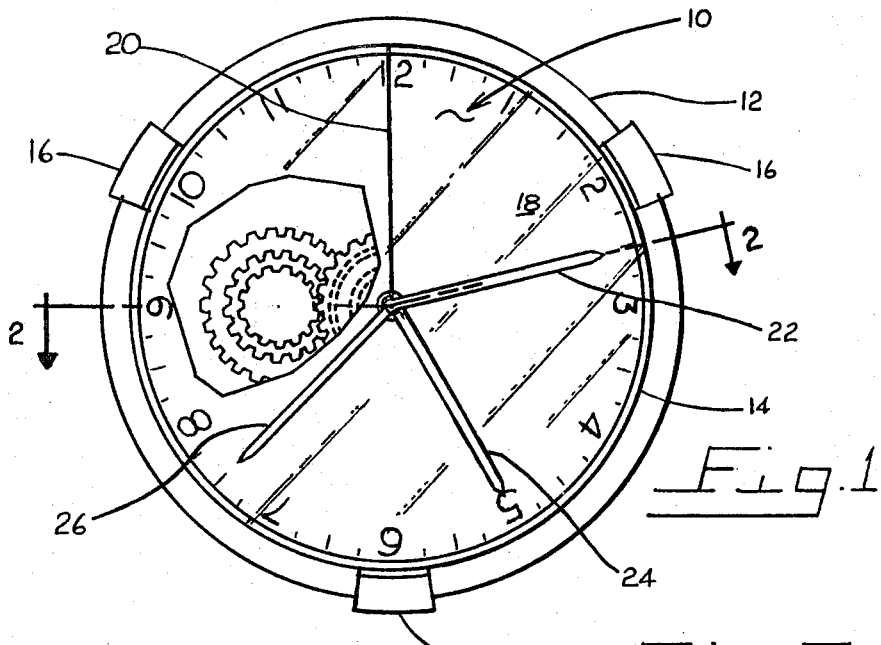
Fig.1
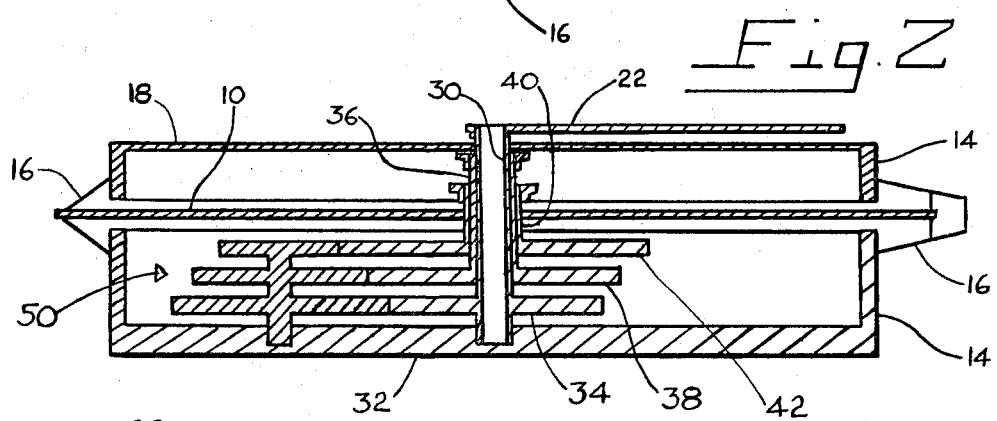
Fig.2
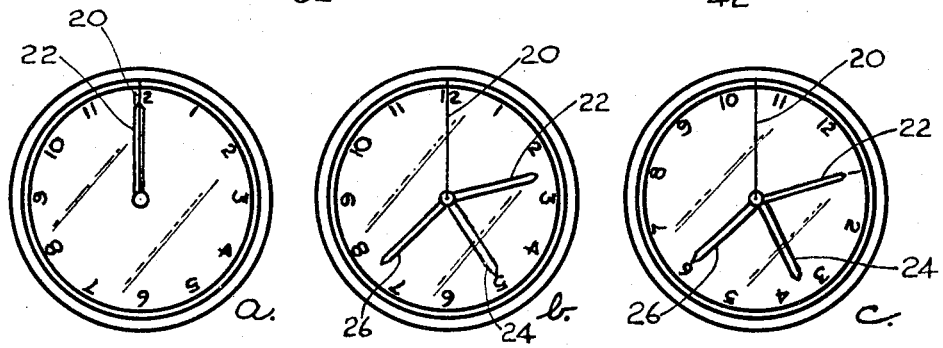
Fig.3
ROBERT B. KENNEDY, INVENTOR.
BY 

United States Patent Office 3,397,840
Patented Aug. 20, 1968

3,397,840
TIME SCHEDULE CALCULATOR
Robert B. Kennedy, 251 Greenoaks Drive,
Atherton, Calif. 94025
Filed June 5, 1967, Ser. No. 643,653
9 Claims. (Cl. 235—120)

ABSTRACT OF THE DISCLOSURE

A time schedule calculator having a time scale and a plurality of time indicating hands mounted for movement along the scale in successive integral ratios. The relative position between the time scale and the indicating hands is adjustable.

*Background of the invention*

This invention relates to a time schedule calculator and particularly to a calculator of unique utility in calculating the schedules of recurrent intervals or events of equal duration such as those of daily motion picture programs.

The complete program of a motion picture theatre typically contains one or two features, previews of coming attractions, a cartoon and an intermission. Some theatres also show short subjects, news of world and sport events, and commercial advertisements. The overall length of the program usually runs between some 90 minutes up to as much as 180 minutes. With each change in the program a new schedule must, of course, be made.

In making up a movie schedule a theatre manager must consider several points. He generally will want to open his theatre doors at an established time and start the show shortly thereafter. He will want to close the show and theatre at an appropriate hour. The manager will also wish to have a feature commence shortly after the normal dinner hour in his community. For example it would be a poor business practice to present the principal feature at 6:00 p.m. since the theatre would probably only be filled to capacity for the show which commenced about 8:00 p.m. The 6:00 show would coincide with dinner for many people, and the 10:00 show would be too late for many. The prudent manager would thus choose 7:00 p.m. and 9:00 p.m. to show features thereby enabling him to show features thereby enabling him to increase the total number of evening patrons.

A typical scheduling problem faced by a modern movie theatre manager might be as follows: The manager finds that his program consists of a 112-minute feature, an 8-minute cartoon, a 13-minute short subject, and a 4-minute intermission for a total program time of 137 minutes. It is the custom of his theatre to open the doors at 10:30 a.m. and to commence the show approximately 15 minutes later. In the local community it is desirable to have a feature commence between 7:00 and 7:30 p.m., and to have the final feature start not later than 9:45 p.m. Faced with these scheduling prerequisites and the particular program on hand, how does the manager reconcile the program with the desired schedule?

Heretofore printed tables have been used to some extent, as have charts. By and large however the schedules have been laboriously made by means of trial and error. In the above example the average theatre manager might have first scheduled opening with his feature at 10:45 a.m. Addition would soon prove however that his evening features would commence at 7:53 and 10:10 having his close at 12:17 a.m. Believing that a feature starting past 10:00 p.m. would not draw a large audience, he would then decide to open with a feature at 10:20 a.m. which would result in features repeating at 12:37, 2:54, 5:11, 7:28 and 9:45 p.m. with an 11:37 p.m. closing.

The above schedule was completed after but two attempts. The chosen example was realistic and typical, but it also was chosen for simplicity of explanation. The theatre manager is quite often faced with more difficult scheduling problems as, for example, in the case of road shows of considerable length, and double features where the principal feature is to be shown at a prime time such as after dinner. Featurettes of significant length coupled with main features of average or above-average length also produce more difficulties.

Accordingly it is an object of the present invention to provide improved means for calculating a time schedule.

Another object of the invention is to provide means for rapidly scheduling a plurality of recurring events of equal duration.

Yet another object of the invention is to provide an aid in calculating a schedule of events having some components parts of equal duration in time.

*Summary of the invention*

Briefly described the present invention is a time schedule calculator comprising a time scale having first and second indicators mounted and linked together for movement along the scale in a 1:2 ratio. Additional indicators may be mounted and linked with the first indicator for movement along the scale in ratios of successive integers therewith. The calculator is also provided with means for adjusting the relative position between the time scale and the indicators.

*Brief description of the drawing*

FIGURE 1 is a plan view of one embodiment of the invention, one section of which is shown broken away revealing internal mechanisms.

FIGURE 2 is a cross-sectional view of the embodiment of FIGURE 1 cut along line 2—2.

FIGURE 3 consists of three sequential plan views *a*, *b* and *c* illustrating the operative steps to be followed in utilizing the calculator of FIGURES 1 and 2.

*Description of the preferred embodiment*

Referring now in more detail to the drawing in which like reference numerals represent like or equivalent parts in the three figures, there is illustrated in FIGURE 1 a time schedule calculator having a rotatable, circular clock dial 10 having a peripheral edge 12. An upper portion of a cylindrical rim 14 is coaxially supported above dial 10 by three brackets 16 which join the upper portion with a lower portion of the rim situated below the dial. The periphery of a transparent plastic disc 18 is affixed to rim 14 above the dial. Edge 12 of clock dial 10 extends radially beyond the bounds of the rim and plastic disc where it is manually accessible. A reference line 20 is imprinted on transparent disc 18 extending from the axis of dial 10 to rim 14.

Two time indicator hands 26 and 24, located beneath the transparent disc, are shown indicating 7:30 and 5:00 respectively. A third time indicating hand 22, located above the transparent disc where it is manually accessible, is shown indicating 2:30. The three hands are respectively joined to sleeves affixed about three coaxial, hollow spindles extending through a center aperture in clock dial 10. The spindles are in turn affixed to a gearing mechanism shown in the cut away portion of the figure.

The gearing mechanism is more clearly illustrated in FIGURE 2. Time indicating hand 22 is connected to a sleeve fixed about spindle 30. The spindle extends through coaxial apertures in disc 18 and dial 10 into an axial positioning recession in base 32. Spur gear 34 is coaxially mounted about the spindle adjacent base 32. The gear meshes with the largest gear in a gear train 50 consisting of three coaxial gears of decreasing radii which are rigidly affixed to one another. Gear train 50 is positioned in a recession in base 32 to rotate about an axis parallel to that of spindle 30. Both the spindle and gear train are held in their respective recessions by unshown screw means.

Time indicating hand 24, shown in FIGURE 1, is connected to a sleeve fixed about spindle 36 which is rotatably mounted below disc 18 about spindle 30. Coaxially mounted about the lower end of spindle 36 is spur gear 38 which meshes with the gear of intermediate radius in gear train 50.

Time indicating hand 26, shown in FIGURE 1, is connected to a sleeve fixed about spindle 40 which is rotatably mounted about spindle 36. Coaxially mounted about the lower end of spindle 40 below dial 10 is spur gear 42 which meshes with the gear of smallest radius in gear train 50.

The radius and number of teeth in gears 34, 38 and 42, and in the gears comprising gear train 50, is such as to produce relative, angular movement ratios of 1:2 between gears 34 and 38, and 1:3 between gears 34 and 42. This relative movement is transmitted to the time indicating hands. Gears 34, 38 and 42 are initially assembled and meshed with the members of gear train 50 so as to superimpose time indicating hands 22, 24 and 26 directly under reference line 20. When the calculator is fully assembled it is possible to move manually accessible time indicating hand 22 thereby causing time indicating hands 24 and 26 to move at two and three times the angular velocity of hand 22 respectively. As hands 24 and 26 are located below transparent disc 18 the operator's finger does not interfere with their movement.

An operative example of the use to which the calculator might be put is illustrated in FIGURE 3. The overly simplified problem here consist of calculating the starting times of three programs of 2½ hours' duration each, the first of which is to commence at 10:30 a.m. The first step is to move the manually accessible hand 22 into alignment with reference line 20 at which position hands 24 and 26 will also be brought into vertical alignment under the reference line. The clock dial is then rotated until the numeral "12" is horizontally aligned with the three hands as shown in FIGURE 3a. Next hand 22 is moved to the 2:30 position which corresponds to the 2½ hour length of the program. In performing this step the other time indicating hands move in integral multiples of the time span swept by the accessible hand to the 5:00 and 7:30 positions as indicated in FIGURE 3b. Finally the clock dial is rotated until the 10:30 opening time is brought under reference line 20 as shown in FIGURE 3c. The program starting times of 10:30, 1:00, 3:30 and 6:00 are then read from the calculator.

It should be appreciated that the calculator is also useful as an aid in calculating a schedule having only some component parts of equal time duration. In the above case for example the user might have wanted to have a 15 minute intermission at the end of only the second program. By referring to FIGURE 3c he readily may mentally add 15 minutes to the times indicated by hands 24 and 26. What is made a very simple matter of mental interpolation with use of the calculator is quite the contrary without such use.

It should be understood also that the above-described embodiment is merely illustrative of applications of the principles of the invention. The calculator may be rectangular rather than circular having standard rack and pinion gear mechanisms. Any number of mechanisms however may be employed for producing either angular or linear relative movement between the time indicators. Furthermore the number of indicator hands may be increased or decreased. The reference line is, of course, optional. Also the dial may consist of either 12 or 24 hour indices.

I claim:
1. A time schedule calculator comprising a time scale, a plurality of time indicator means linked to one another for relative movement therebetween along said time scale to indicate at least one time span, and means for adjusting the relative position between said time scale and said plurality of time indicator means while maintaining said plurality of time indicator means in a fixed position relative to each other whereby said time span remains fixed during said adjustment.
2. Claim 1 having an independent time indicator not linked to said plurality of time indicator means.
3. Claim 1 wherein said time scale is an annular dial, and where said plurality of time indicator means are mounted to revolve about a common axis disposed perpendicular to the plane of said annular dial.
4. Claim 3 wherein said annular dial is rotatably mounted for angular movement with respect to said plurality of time indicating means.
5. Claim 1 wherein said time scale is a circular clock having 12 hour indices and wherein said plurality of time indicator means comprise clock hands mounted to revolve about the axis of said circular clock.
6. Claim 1 wherein said plurality of time indicator means linked to one another for relative movement therebetween along said time scale comprise 1st and 2nd indicator means geared together for movement along said time scale in a 1:2 ratio.
7. Claim 6 having a 3rd indicator means mounted for movement along said time scale, said 3rd indicator means geared to said 1st indicator means for movement along said time scale in a 3:1 ratio whereby at least two equal and consecutive time spans are indicated.
8. A time schedule calculator for scheduling a plurality of recurring events of equal time span comprising a time scale, at least three time indicator means linked to one another for relative movement therebetween along said time scale to indicate the starting times of at least three equal and consecutive time spans and the ending times of at least two of said time spans, and means for adjusting the relative position between said time scale and said indicator means while maintaining the indicator means in fixed position relative to each other to maintain said equal and consecutive time spans indicated by said indicator means fixed during said adjustment, whereby said three starting times may be simultaneously changed by equal time increments without altering the lengths of said time spans.
9. The time schedule calculator of claim 8 wherein said three time indicator means comprise a first indicator, a second indicator geared to said first indicator in a 2:1 ratio, and a third indicator geared to said first indicator in a 3:1 ratio.

References Cited

UNITED STATES PATENTS

| | | | |
|---|---|---|---|
| 1,419,029 | 6/1922 | Doll | 58—126 |
| 1,759,080 | 5/1930 | Youngblodt | 116—133 |
| 1,790,359 | 1/1931 | Weir | 116—133 |
| 2,026,998 | 1/1936 | Sanford et al. | 235—88 |
| 2,177,978 | 10/1939 | Daruie | 116—133 |
| 2,251,021 | 7/1941 | Nebergall | 58—126 |
| 2,282,209 | 5/1942 | Pepper et al. | 116—133 |
| 2,391,771 | 12/1945 | Clark | 235—83 |
| 2,829,620 | 4/1958 | Wilson | 116—133 |
| 3,131,489 | 5/1964 | Alpert | 116—133 |
| 2,289,038 | 7/1942 | Putnam | 58—126 |
| 3,317,130 | 5/1967 | Evans | 235—61 |

RICHARD B. WILKINSON, *Primary Examiner.*

S. A. WAL, *Assistant Examiner.*